Jan. 24, 1928.

V. KARAPETOFF 1,657,262

ELECTRIC METERING SYSTEM

Filed Oct. 5, 1923

2 Sheets-Sheet 1

Inventor:
Vladimir Karapetoff;
by
His Attorney.

Jan. 24, 1928.

V. KARAPETOFF 1,657,262

ELECTRIC METERING SYSTEM

Filed Oct. 5, 1923

2 Sheets-Sheet 2

Inventor:
Vladimir Karapetoff;
by Alexander S. Lunt
His Attorney.

Patented Jan. 24, 1928.

1,657,262

UNITED STATES PATENT OFFICE.

VLADIMIR KARAPETOFF, OF ITHACA, NEW YORK, ASSIGNOR TO GENERAL ELECTRIC COMPANY, A CORPORATION OF NEW YORK.

ELECTRIC METERING SYSTEM.

Application filed October 5, 1923. Serial No. 666,810.

My invention relates to electric metering systems and apparatus therefor and in particular to a metering system and apparatus for ascertaining the energy taken from and returned to a single phase alternating current line due to the use of inductive or capacitive load apparatus.

Central stations which furnish electric power have to contend, among other unfavorable conditions, with single phase loads of low power factor and widely fluctuating demands. Among such loads may be mentioned single phase arc furnaces, spot welders and single phase motors in certain drives. In addition to the actual kilowatt load used, such customers should pay extra charges for maximum demand and for low power factors. A kilovolt ampere demand charge is one proposal; a separate charge for reactive kilovolt amperes is another proposal for meeting such cases; but at the present time there is no general agreement on this point and charges based upon kilovolt amperes are in general not readily understood by many consumers and are consequently looked upon with suspicion.

It is the primary object of my invention to provide a metering scheme for low power factor loads which will be more readily understood by the average consumer and is based upon the assumption that any consumer whose installation causes out-of-phase current in the line is, in fact, a periodic borrower of electric energy. During a part of the cycle he takes more energy than he needs, stores the excess in various magnetic fluxes in his apparatus, assuming the current to be lagging, and then returns it to the line during another part of the cycle. He is like a restaurant keeper who buys, say, one hundred pounds of meat in the morning and asks the butcher to take back twenty pounds in the evening. A butcher who caters to such trade either has to establish a higher rate for all the meat sold or else take the return meat at a lower rate. This is analogous to the condition of an alternating current circuit feeding inductive load apparatus.

Figure 3:
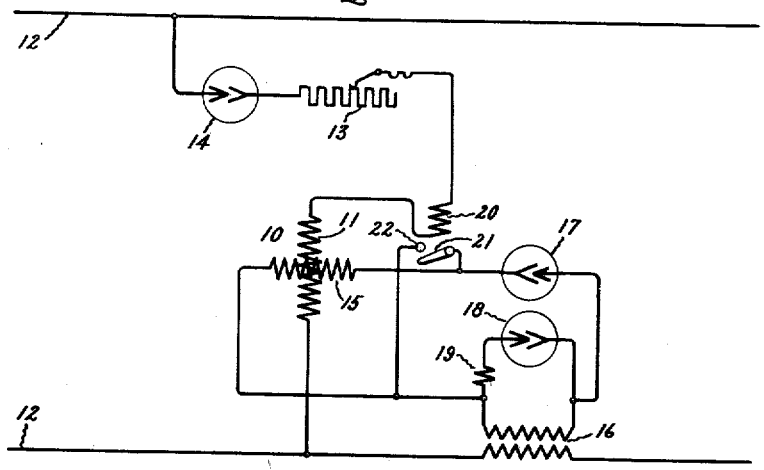
Figure 4:
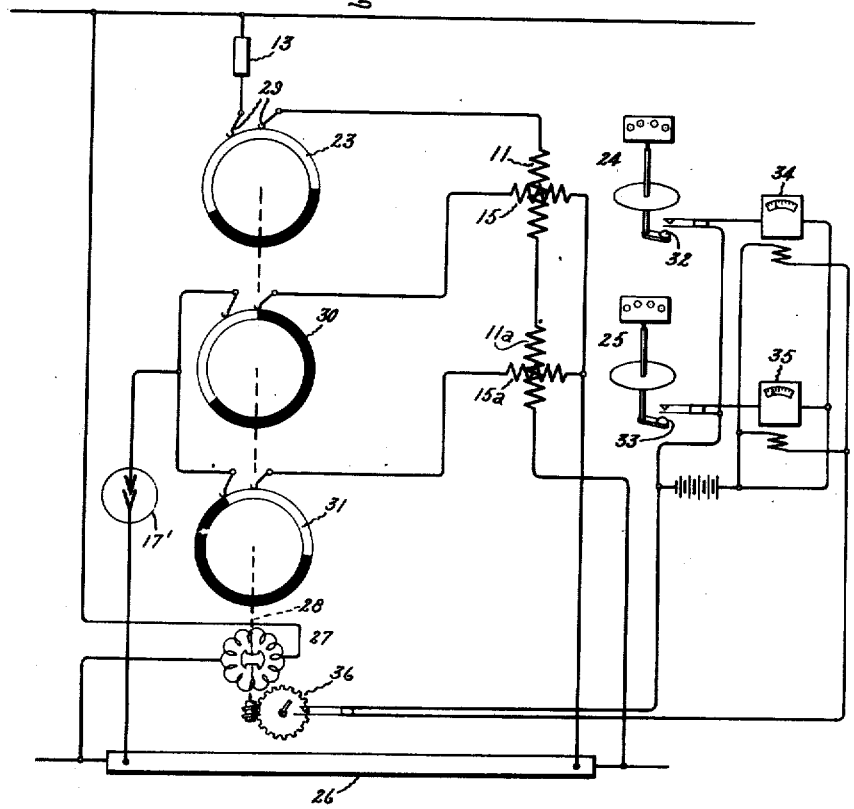

The features of my invention which I believe to be novel and patentable will be pointed out in the claims appended hereto. For a better understanding of my invention, reference is made in the following description to the accompanying drawing, Figs. 1 and 2 of which are curves representing the instantaneous current, voltage and power taken by consumers of lagging and leading currents respectively; Fig. 3 illustrates apparatus for carrying out my invention where the circulating current drawn from the line is either always reactive or always capacitive; and Fig. 4 represents apparatus for carrying out my invention where the circulating current is both reactive and capacitive at different times, together with apparatus for indicating the maximum demand of the borrowed energy.

Figure 1:
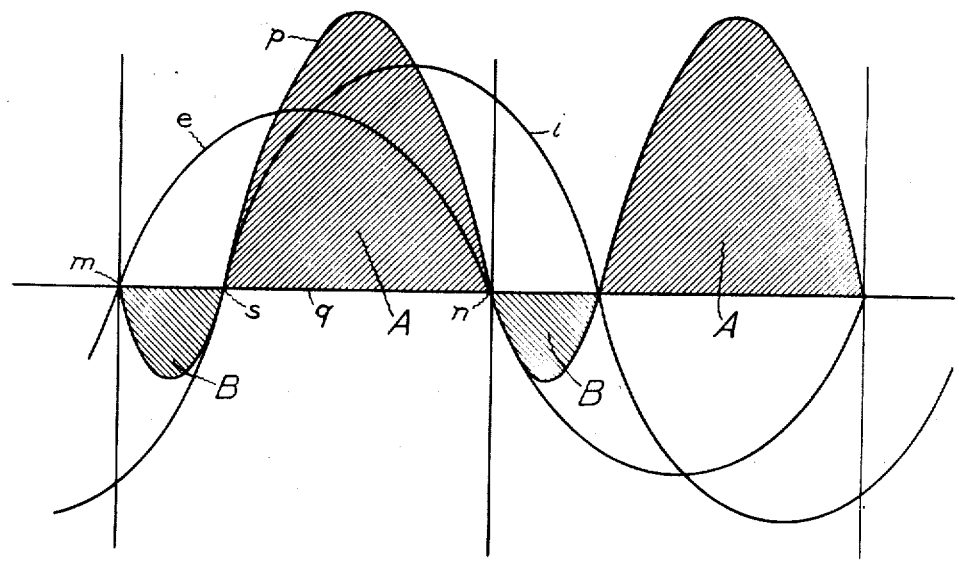

Referring to the drawing, Fig. 1 shows the curves of instantaneous voltage and power taken by a consumer with a lagging current. Non-sinusoidal curves are assumed for the sake of generality since my method of measurement applies equally well to distorted wave forms. The power curve, $p=ei$, is drawn by multiplying the instantaneous values of current $i$ and voltage $e$. The positive energy is denoted by A and the negative energy by B. It will be seen that, with the lagging current, energy is returned to the line immediately after the reversal of the line voltage, that is, following the instants $m$ and $n$.

Figure 2:
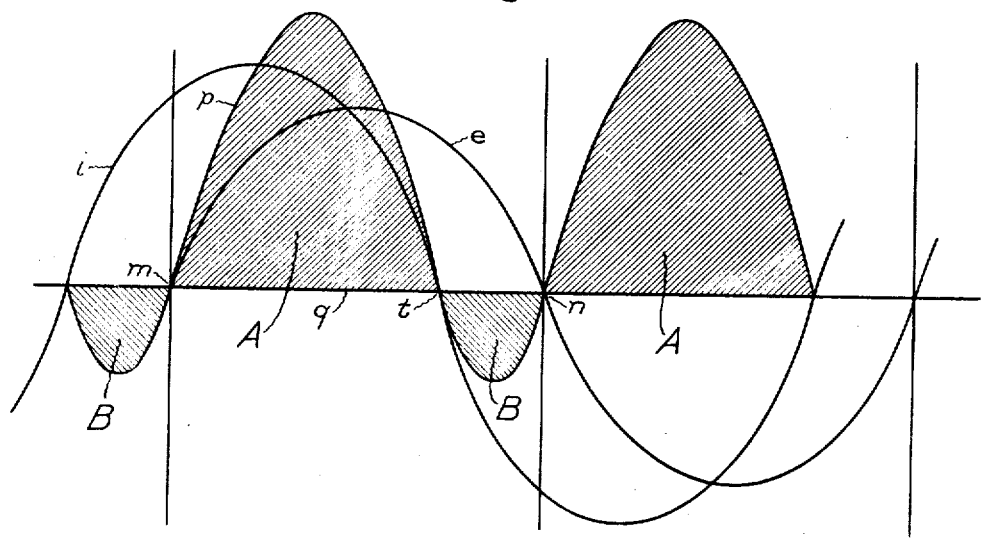

In Fig. 2, similar curves are drawn for a leading current. In this case energy is returned to the line immediately before the reversal of the voltage. Using our former analogy and assuming the points $m$ and $n$ to correspond to noon and to midnight, we may say that a consumer with a lagging current is like a restaurant keeper who returns meat (energy) to the butcher early in the afternoon and early in the morning, while a consumer with a leading current returns it just before noon and midnight. Most consumers of electric energy are of the class represented in Fig. 1, and for this reason a consumer of the class shown in Fig. 2 is a desirable one, in that his returned energy can be used directly in installations with a lagging current. But if nearly all consumers took leading currents, they would also become undesirable from the point of view of energy balance.

According to my invention, I provide a measuring instrument for measuring directly the return energy B, which also discriminates between that returned before and after the voltage reversal. The monthly amount so returned, or the maximum amount returned during any consecutive fifteen minute interval may be made the basis for a supplementary charge. This does away with kilovolt amperes, reactive power, average power factor and other terms which are obscure to many users of energy and to many members of rate regulating bodies. With my apparatus, the user is simply told that he has actually used so much energy and has returned so much to the power company. Any business man or legislator will understand that if one buys more than is needed, and returns the excess at inconvenient times, one may be expected to pay more than if he bought just enough for his needs. Moreover, the proposed method of measurement not only penalizes the user, but offers him a practical method of avoiding the penalty. He only has to reduce his lagging current, especially during the intervals of maximum demand, and he will find a reduction in the reading of his "returned energy" or penalizing meter.

An arrangement for measuring single phase returned energy is shown in Fig. 3. 10 is a wattmeter, either of the integrating, indicating or recording type and it may be equipped with a demand register according to the desired character of the record. The potential winding 11 of the wattmeter is connected across the line 12 in series with the multiplier 13 and the rectifier 14. The latter may be of the aluminum, mercury vapor, vibrating contact, hot-cathode, or any other type suitable for small currents. The purpose of this rectifier is to allow only the positive half wave, for example, of the voltage, between $m$ and $n$, Fig. 1, to produce a current in the winding 11.

The current winding 15 of the wattmeter 10 is connected to the line through a current transformer 16. A rectifier 17 is placed in series with the winding 15 to allow only negative half waves, for example, of the current to pass through it. With this arrangement, the moving part of the instrument is subject to a torque only when the voltage is positive and the current is negative, that is, during the portion $ms$ of the cycle. In other words, the indication is proportional to the returned energy B. Preferably, a rectifier 18 short-circuits the transformer 16 for the positive half wave. Without it, the fluctuating impedance of the primary winding of the transformer 16 might be objectionable from the point of view of the power circuit. An impedance 19 may be provided and adjusted to be approximately equal to that of the current winding of the wattmeter so as to have the primary circuit conditioned the same during both half waves.

When the installation is such that only a lagging and not a leading current may be expected, the described arrangement will give a true measure of the returned energy. Of course, the meter calibration must be such that the actual measurement is multiplied by 2 because only every second amount B is measured.

When there is a possibility of a leading current, and when the consumer is not to be penalized for it, an additional device must be provided to prevent registration between the points $t$ and $n$, Fig. 2, which interval also corresponds to a positive voltage and a negative current. One way of accomplishing this result is to short circuit the current winding of the wattmeter between the instants $q$ and $n$. In Fig. 3 this is accomplished by means of the coil 20 in the potential circuit, a polarized steel tongue 21 and the short circuiting contact 22. The tongue 21 vibrates synchronously under the influence of the current in coil 20 and may be adjusted to close the contacts 21, 22, over the desired part of the cycle.

The device shown in Fig. 4 differs from that shown in Fig. 3 in three respects, namely, a synchronously rotating contact ring 23 is employed in place of the potential rectifier; both the leading and the lagging returned energy is registered on two separate wattmeters represented as of the integrating type; and an inductive ampere shunt 26 is used in place of the current transformer so that only one current rectifier 17' is required. A miniature single phase synchronous motor 27 drives a shaft 28, which motor should preferably be of the self-starting type, similar to the well known Warren motor used in electric clocks. The potential windings 11 and 11ª of the two wattmeters are connected in series with the multiplier 13 and the contact ring 23. The brushes 29, which bear upon this ring, are set so that the circuit is closed only during the positive half waves of the voltage cycle, that is, during the interval $mn$, Figs. 1 and 2, and for this purpose a portion of the ring 23 is made conducting and the remaining portion of insulating material as illustrated. The current windings 15 and 15ª of the wattmeters are connected in parallel across the ammeter shunt 26, through rectifier 17' and contact rings 30 and 31 mounted on shaft 28. The rectifier 17' allows only negative current to pass through the windings. The contacts and brushes on the rings 30 and 31 are so arranged that the circuit of coil 15 is closed only during the part $mq$ of the cycle, while the circuit of coil 15ª is closed only during the interval $qn$. The position of the rings illustrated corresponds to instant $q$ on the curves. Therefore, the meter 24 measures the lagging returned energy and the meter 25 measures the leading returned energy. Both meters may register separately or a resultant reading obtained by means of suitable differential gearing. If there is no penalty and no credit for returned leading energy, the meter 25 and the ring 31 may be omitted.

In Fig. 4 I have represented the meters 24 and 25 as of the integrating type. If desired, these meters may be provided with suitable contactors 32 and 33, arranged to energize the notching up circuits of demand meters 34 and 35 respectively. The timed reset devices of the demand meters may be energized by a contactor 36 operated by the synchronous motor 27. The demand meters represented are of a well known type and their construction constitutes no part of my invention so that further description thereof is considered unnecessary. As represented, the integrated inductive and capacitive returned energy is registered by the meters 24 and 25 respectively and the maximum demand thereof by the meters 34 and 35 respectively. Since in this modification a synchronous motor 27 is used for driving the shaft 28, it may also serve as a timing device for the demand meters, thereby obviating the necessity of a separate clock for that purpose.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In combination an alternating current circuit together with a power metering device connected therewith and means included in the circuit connections of said meter for permitting only a negative power component to be metered.

2. In combination an alternating current circuit, a power meter connected thereto and means included in the circuit connections of said meter for permitting only a negative component of the power flowing in said circuit due to lagging currents to be metered.

3. In combination an alternating current circuit, power metering equipment connected thereto, and means included in the circuit connections of said equipment for permitting only negative power components due to leading and lagging currents to be metered.

4. In combination an alternating current circuit, a pair of power meters connected thereto, means included in the circuit connections of one of said meters for permitting only a negative power component due to lagging current to be metered, and means included in the circuit connection of the other meter for permitting only a negative power component due to leading currents to be metered.

5. An alternating current circuit, a power meter connected thereto and means associated with the circuit connections of said meter for allowing only half waves of current and voltage to affect said meter.

6. In combination, a single phase circuit, a single phase integrating wattmeter connected thereto, means in the circuit connections of said wattmeter including a synchronously driven contactor for permitting only simultaneous potential and current impulses of opposite wave sign to affect said instrument, a synchronous motor energized from said circuit for driving said contactor, and a maximum demand meter for registering the maximum demand of said wattmeter, said synchronous motor acting as the timing device for said demand meter.

7. A single phase alternating current circuit, a wattmeter connected thereto and means included in the circuit connections of said wattmeter for permitting only simultaneous potential and current impulses of opposite wave sign to affect said wattmeter.

8. A single phase alternating current circuit, a wattmeter connected thereto and means included in the circuit connections of said wattmeter for permitting only simultaneous potential and current impulses of opposite wave sign which occur at one end only of the potential wave to affect said wattmeter.

9. A single phase alternating current circuit, a wattmeter connected thereto, means included in the circuit connections of said wattmeter for permitting only simultaneous potential and current impulses of opposite wave sign to affect said instrument and synchronous motor means energized from said circuit for permitting such impulses as occur at one end only of the voltage waves to affect said wattmeter.

10. In combination, a single phase alternating current circuit, a pair of wattmeters connected to said circuit, means included in the circuit connections of said wattmeters for permitting only simultaneous potential and current impulses of opposite wave sign to affect said wattmeters and means for permitting such impulses as occur at one end only of the potential wave to affect one wattmeter and the impulses which occur at the opposite end only of the potential waves to affect the other wattmeter.

11. In combination, a single phase alternating current circuit, a pair of wattmeters connected thereto, synchronously driven contactors in said circuit connections, a rectifier in series which the current coils of said wattmeters, said rectifier and contactors being arranged to cause one of said wattmeters to measure only the negative component of power due to lagging current in said circuit and to cause the other wattmeter to measure only the negative component of power due to leading current in said circuit.

12. The method of determining the amount of energy borrowed and returned to a single phase alternating current system due to out-of-phase current therein which consists in segregating current impulses from said circuit which are of opposite sign and which are proportional to the current and voltage of the line respectively and measuring their product.

In witness whereof, I have hereunto set my hand this 1st day of October 1923.

VLADIMIR KARAPETOFF.

ponent of power due to leading current in said circuit.

12. The method of determining the amount of energy borrowed and returned to a single phase alternating current system due to out-of-phase current therein which consists in segregating current impulses from said circuit which are of opposite sign and which are proportional to the current and voltage of the line respectively and measuring their product.

In witness whereof, I have hereunto set my hand this 1st day of October 1923.

VLADIMIR KARAPETOFF.

CERTIFICATE OF CORRECTION.

Patent No. 1,657,262.         Granted January 24, 1928, to

VLADIMIR KARAPETOFF.

It is hereby certified that error appears in the printed specification of the above numbered patent requiring correction as follows: Page 3, line 124, claim 11, for the word "which" read "with"; and that the said Letters Patent should be read with this correction therein that the same may conform to the record of the case in the Patent Office.

Signed and sealed this 14th day of February, A. D. 1928.

Seal.

M. J. Moore,
Acting Commissioner of Patents.

CERTIFICATE OF CORRECTION.

Patent No. 1,657,262. Granted January 24, 1928, to

VLADIMIR KARAPETOFF.

It is hereby certified that error appears in the printed specification of the above numbered patent requiring correction as follows: Page 3, line 124, claim 11, for the word "which" read "with"; and that the said Letters Patent should be read with this correction therein that the same may conform to the record of the case in the Patent Office.

Signed and sealed this 14th day of February, A. D. 1928.

Seal.

M. J. Moore,
Acting Commissioner of Patents.